United States Patent
Chou (10) Patent No.: US 11,240,654 B2
(45) Date of Patent: Feb. 1, 2022

(54) WIRELESS LOCAL AREA NETWORK (WLAN) TRAFFIC LOAD MEASUREMENT PROVISIONING TO WIRELESS CELLULAR NETWORKS

(71) Applicant: Apple Inc., Cupertino, CA (US)

(72) Inventor: Joey Chou, Scottsdale, AZ (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/771,839

(22) PCT Filed: Dec. 27, 2013

(86) PCT No.: PCT/US2013/078112
§ 371 (c)(1),
(2) Date: Sep. 1, 2015

(87) PCT Pub. No.: WO2014/158279
PCT Pub. Date: Oct. 2, 2014

(65) Prior Publication Data
US 2016/0029249 A1 Jan. 28, 2016

Related U.S. Application Data

(60) Provisional application No. 61/806,821, filed on Mar. 29, 2013.

(51) Int. Cl.
*H04W 28/08* (2009.01)
*H04W 28/02* (2009.01)
(Continued)

(52) U.S. Cl.
CPC .............. *H04W 8/082* (2013.01); *H04B 1/56* (2013.01); *H04B 7/0417* (2013.01);
(Continued)

(58) Field of Classification Search
CPC ........... H04W 28/085; H04W 28/0205; H04W 84/12
See application file for complete search history.

(56) References Cited

U.S. PATENT DOCUMENTS

2006/0072502 A1\* 4/2006 Crandall ............... H04W 72/02
370/329
2007/0109980 A1 5/2007 Awater et al.
(Continued)

FOREIGN PATENT DOCUMENTS

CN 102640525 A 8/2012
WO 2012021879 2/2012
(Continued)

OTHER PUBLICATIONS

Taiwan Office Action from related application 103111451 dated Jun. 24, 2015.
(Continued)

*Primary Examiner* — Kodzovi Aco Acolatse
*Assistant Examiner* — Farhad Ali
(74) *Attorney, Agent, or Firm* — Eschweiler & Potashnik, LLC (57) ABSTRACT

Generally, this disclosure provides devices, systems and methods for provisioning of wireless local area network (WLAN) traffic load measurements to third generation partnership project 3GPP wireless cellular networks. A WLAN element manager (EM) may include a polling module to poll a WLAN access point (AP), the polling to request traffic load data from the WLAN AP; a timer module to trigger the polling module to poll at periodic intervals; a logging module to receive and log the requested traffic load data; and an integration reference point (IRP) agent including a reporting module to generate a traffic load report for transmission to a network manager (NM), the traffic load report based on the logged traffic load data.

15 Claims, 7 Drawing Sheets

(51) Int. Cl.

| | |
|---|---|
| H04W 8/08 | (2009.01) |
| H04L 5/00 | (2006.01) |
| H04B 1/56 | (2006.01) |
| H04B 7/06 | (2006.01) |
| H04W 76/15 | (2018.01) |
| H04W 36/26 | (2009.01) |
| H04W 48/18 | (2009.01) |
| H04W 36/00 | (2009.01) |
| H04N 21/24 | (2011.01) |
| H04N 21/845 | (2011.01) |
| H04L 12/927 | (2013.01) |
| H04W 36/12 | (2009.01) |
| H04B 7/0452 | (2017.01) |
| H04B 7/08 | (2006.01) |
| H04L 1/18 | (2006.01) |
| H04L 29/06 | (2006.01) |
| H04N 21/8543 | (2011.01) |
| H04M 1/72457 | (2021.01) |
| H04W 48/16 | (2009.01) |
| H04W 24/00 | (2009.01) |
| H04B 7/0417 | (2017.01) |
| H04W 36/22 | (2009.01) |
| H04W 24/02 | (2009.01) |
| H04W 72/04 | (2009.01) |
| H04W 72/08 | (2009.01) |
| H04W 28/20 | (2009.01) |
| H04W 4/021 | (2018.01) |
| H04W 8/02 | (2009.01) |
| H04W 8/06 | (2009.01) |
| H04W 48/06 | (2009.01) |
| H04W 56/00 | (2009.01) |
| H04L 25/02 | (2006.01) |
| H04L 25/03 | (2006.01) |
| H04W 48/12 | (2009.01) |
| H04W 36/08 | (2009.01) |
| H04W 88/08 | (2009.01) |
| H04W 84/04 | (2009.01) |
| H04W 88/10 | (2009.01) |
| H04W 84/12 | (2009.01) |
| H04W 88/02 | (2009.01) |

(52) U.S. Cl.
CPC ......... *H04B 7/0452* (2013.01); *H04B 7/063* (2013.01); *H04B 7/0617* (2013.01); *H04B 7/0619* (2013.01); *H04B 7/0695* (2013.01); *H04B 7/088* (2013.01); *H04L 1/1864* (2013.01); *H04L 5/0048* (2013.01); *H04L 5/0051* (2013.01); *H04L 5/0057* (2013.01); *H04L 5/0085* (2013.01); *H04L 25/0206* (2013.01); *H04L 25/03305* (2013.01); *H04L 47/803* (2013.01); *H04L 65/4092* (2013.01); *H04L 65/601* (2013.01); *H04L 65/602* (2013.01); *H04L 65/604* (2013.01); *H04L 65/607* (2013.01); *H04L 65/608* (2013.01); *H04L 65/80* (2013.01); *H04M 1/72457* (2021.01); *H04N 21/2402* (2013.01); *H04N 21/8456* (2013.01); *H04N 21/8543* (2013.01); *H04W 4/021* (2013.01); *H04W 8/02* (2013.01); *H04W 8/06* (2013.01); *H04W 24/00* (2013.01); *H04W 24/02* (2013.01); *H04W 28/02* (2013.01); *H04W 28/0226* (2013.01); *H04W 28/0289* (2013.01); *H04W 28/20* (2013.01); *H04W 36/0011* (2013.01); *H04W 36/0022* (2013.01); *H04W 36/125* (2018.08); *H04W 36/22* (2013.01); *H04W 36/26* (2013.01); *H04W 48/06* (2013.01); *H04W 48/16* (2013.01); *H04W 48/18* (2013.01); *H04W 56/001* (2013.01); *H04W 72/0446* (2013.01); *H04W 72/082* (2013.01); *H04W 76/15* (2018.02); *H04L 5/0007* (2013.01); *H04L 2025/03426* (2013.01); *H04W 28/085* (2013.01); *H04W 36/0072* (2013.01); *H04W 36/08* (2013.01); *H04W 48/12* (2013.01); *H04W 72/046* (2013.01); *H04W 84/042* (2013.01); *H04W 84/045* (2013.01); *H04W 84/12* (2013.01); *H04W 88/02* (2013.01); *H04W 88/08* (2013.01); *H04W 88/10* (2013.01); *Y02D 30/70* (2020.08)

(56) References Cited

U.S. PATENT DOCUMENTS

| | | | |
|---|---|---|---|
| 2007/0258384 A1 | 11/2007 | Sammout et al. | |
| 2011/0249557 A1 | 10/2011 | Malati et al. | |
| 2011/0287794 A1* | 11/2011 | Koskela | H04W 28/08 455/509 |
| 2012/0282968 A1* | 11/2012 | Toskala | H04W 24/10 455/517 |
| 2013/0023267 A1* | 1/2013 | Ong | H04W 48/10 455/435.1 |
| 2013/0163463 A1* | 6/2013 | Grayson | H04L 43/0876 370/253 |
| 2013/0230035 A1* | 9/2013 | Grandhi | H04W 48/16 370/338 |
| 2015/0319635 A1* | 11/2015 | Bergquist | H04L 1/1685 370/241.1 |

FOREIGN PATENT DOCUMENTS

| | | |
|---|---|---|
| WO | 2012100199 A2 | 7/2012 |
| WO | 2012148482 | 11/2012 |

OTHER PUBLICATIONS

International Preliminary Report on Patentability and Written Opinion from related application PCT/US2013/078112 dated Sep. 29, 2015.
International Search Report from related application PCT/US2013/078112 dated Apr. 10, 2014.
Korean Office Action from related application 10-2015-7023261 dated Jul. 22, 2016.
3GPP, "3rd Generation Partnership Project; Technical Specification Group Services and System Aspects; Telecommunication management; Study on WLAN Management (Release 12)," 3GPP TR 32.841 V0.3.0, Feb. 19, 2013.
3GPP TS 36.300, V11.2.0, Evolved Universal Terrestrial Radio Access (E-UTRA) and Evolved Universal Terrestrial Radio Access Network (E-UTRAN); Overall description; Stage 2 (Release 11).
Extended European Search Report issued in European Application No. 13879964.8, dated Dec. 1, 2016.
3GPP Standard; 3GPP TS 32,401, "3rd Generation Partnership Project; Technical Specification Group Services and System Aspects; Telecommunication management; Performance Management (PM); Concept and requirements (Release 1 1 )" vol. SA WG5, No. VII.0.0, Sep. 25, 2012 (Sep. 25, 2012), pp. 1-29, XP050650O05, [retrieved on Sep. 25, 2012].
3GPP Standard; 3GPP TS 32.432, "3rd Generation Partnership Project; Technical Specification Group Services and System Aspects; Telecommunication management; Performance measurement: File format definition (Release 1 1 )", vol. SA WG5, No. VII.0.0, Sep. 25, 2012 (Sep. 25, 2012), pp. 1-14.
3GPP Standard; 3GPP TS 32.102, "3rd Generation Partnership Project; Technical Specification Group Services and System Aspects; Telecommunication management; Architecture (Release 1 1 )", vol. SA WG5, No. VII.0.0, Sep. 25, 2012 (Sep. 25, 2012), pp. 1-45.

(56) References Cited

OTHER PUBLICATIONS

"PCR WLAN PM data collection", 3GPP Draft; S5-131026 PCR WLAN Data Collection, 3rd Generation Partnership Project (3GPP), vol. SA WG5, No. Sophia Antipolis, Jun. 10, 2013 (Jun. 10, 2013), XP050711363, Retrieved from the Internet:URL:http://www.3gpp.org/ftp/tsg_sa/WG5_TM/TSGS5_89/Docs/ [retrieved on Jun. 10, 2013].
3GPP, "3rd Generation Partnership Project; Technical Specification Group Services and System Aspects; Telecommunication management; Study on WLAN Management (Release 12)," 3GPP TR 32.841 V0.3.0, Feb. 19, 2013., http://www.3gpp.org/ftp/Specs/archive/32_series/32.841, 10 pages.
Korean Office Action issued in Korean Application No. 2017-7008694, dated Jun. 8, 2017, with English translation, 13 pages.
Korean Office Action issued in Korean Application No. 2017-7008694, dated Jan. 3, 2018, with English translation, 10 pages.
3GPP TSG-RAN2 Meeting #81 R2-130051, St. Julian's, Malta, Jan. 28 to Feb. 1, 2013, 3 pages.
Chinese Office Action issued in Chinese Application No. 2013800737346, dated Jan. 17, 2018, with English translation, 15 pages.
Chinese Office Action in Chinese Patent Application No. 2013800737346, dated Sep. 30, 2018, 13 pages.
"3rd Generation Partnership Project; Technical Specification Group Services and System Aspects; General Packet Radio Service (GPRS) Enhancements for Evolved Universal Terrestrial Radio Access Network (E-UTRAN) Access (Release 12)"; 3GPP TS 23.401 V12.0.0; Mar. 2013; p. 1-5.
Chinese Office Action in Chinese Patent Application No. 2013800737346, dated Feb. 28, 2019, 16 pages.
European Office Action in European Patent Application No. 13879964, dated Mar. 7, 2019, 6 pages.

* cited by examiner

```
                                                          ⌐ 402
dot11CountersTable OBJECT-TYPE
        SYNTAX SEQUENCE OF Dot11CountersEntry
        MAX-ACCESS not-accessible
        STATUS current
        DESCRIPTION
        "Group containing attributes that are MAC counters. Implemented as a table to allow
        for multiple instantiations on an agent."
        ::= { dot11mac 2 }

⌐ 402 dot11CountersEntry OBJECT-TYPE
        SYNTAX Dot11CountersEntry
        MAX-ACCESS not-accessible
        STATUS current
        DESCRIPTION
        "An entry in the dot11CountersEntry Table.
        ifIndex - Each IEEE 802.11 interface is represented by an ifEntry. Interface tables in this
        MIB module are indexed by ifIndex."
        INDEX { ifIndex }
        ::= { dot11CountersTable 1 }

⌐ 402

Dot11CountersEntry ::= SEQUENCE { dot11TransmittedFragmentCount Counter32,
        dot11MulticastTransmittedFrameCount     Counter32,
        dot11FailedCount                        Counter32,
        dot11RetryCount                         Counter32,
        dot11MultipleRetryCount                 Counter32,
        dot11FrameDuplicateCount                Counter32,
        dot11RTSSuccessCount                    Counter32,
        dot11RTSFailureCount                    Counter32,
        dot11ACKFailureCount                    Counter32,
        dot11ReceivedFragmentCount              Counter32,
        dot11MulticastReceivedFrameCount        Counter32,
        dot11FCSErrorCount                      Counter32,
        dot11TransmittedFrameCount              Counter32,
        dot11WEPUndecryptableCount              Counter32,
        dot11QosDiscardedFragmentCount          Counter32,
        dot11AssociatedStationCount             Counter32,
        dot11QosCFPollsReceivedCount            Counter32,
        dot11QosCFPollsUnusedCount              Counter32,         ⌐ 404
        dot11QosCFPollsUnusableCount            Counter32,
        dot11ChannelUtilization                 Counter32,
        dot11AvailableAdmissionCapacity         Counter32
                                                                   ⌐ 406
```

```
dot11ChannelUtilization OBJECT-TYPE
        SYNTAX Counter32 (0..255)
        UNITS "1/255"
        MAX-ACCESS read-only
        STATUS current
        DESCRIPTION
                "This counter indicates the percentage of time, normalized to 255,
                the AP sensed the medium was busy, as indicated by either the
                physical or virtual carrier sense (CS) mechanism. This percentage
                is computed using the formula, as defined in section 8.4.2.30."
        REFERENCE
                "IEEE 802.11 8.4.2.30"
        ::= { dot11CountersEntry 20 }
```

```
dot11AvailableAdmissionCapacity OBJECT-TYPE
        SYNTAX Counter32 (0..65535)
        UNITS "32µs"
        MAX-ACCESS read-only
        STATUS current
        DESCRIPTION
                "This counter indicates the remaining amount of medium time
                available via explicit admission control, in units of 32 µs."
        REFERENCE
        "IEEE 802.11 8.4.2.30"
        ::= { dot11CountersEntry21 }
```

WIRELESS LOCAL AREA NETWORK (WLAN) TRAFFIC LOAD MEASUREMENT PROVISIONING TO WIRELESS CELLULAR NETWORKS

CROSS-REFERENCE TO RELATED APPLICATIONS

The present patent application is related to and claims priority to U.S. Provisional Patent Applications: Ser. No. 61/806,821, filed Mar. 29, 2013, the contents of which are incorporated herein by reference in their entirety.

FIELD

The present disclosure relates to Wireless Local Area Network (WLAN) traffic load measurement, and more particularly, to provisioning of WLAN traffic load measurements to Third Generation Partnership Project (3GPP) wireless cellular networks.

BACKGROUND

The accelerated adoption of smartphones, tablets and cloud computing has resulted in the rapid growth of global mobile data traffic. Projections indicate that a 26-fold increase in mobile data traffic may be expected by 2015, compared to 2010, with data traffic reaching a rate of 6.3 exabytes per month. The scaling of network capacity through deployment of additional base stations and the implementation of new technology may be of limited effectiveness in dealing with this growth since mobile data pricing tends to remain relatively flat.

One approach to this problem involves offloading of data traffic from the mobile wireless cellular network, for example a 3GPP Long Term Evolution (LTE) or LTE-Advanced (LTE-A) network, to a Wireless Local Area Network (WLAN). In this scenario, a wireless mobile device, for example User Equipment (UE), which is served by a cell base station, for example an evolved Node B (eNB), may offload some or all of the data traffic to an available WLAN access point (AP). A mechanism is needed, however, for eNBs to determine the relative traffic loading of WLAN APs that may be available for such offloading, to ensure efficient and reliable operation of the system so that the objectives of mobile data offload are achieved.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides devices, systems and methods for provisioning of WLAN traffic load measurements to 3GPP wireless cellular networks, for example an LTE or LTE-A network. WLAN offloading is a technique for load balancing where traffic from a relatively overloaded eNB may be offloaded to one of a number of underlying WLAN APs. The selection of the WLAN AP for offloading may be facilitated by the provisioning, to the eNB, of relatively current traffic load measurements associated with the APs such that a relatively less loaded AP may be selected. Since a direct communication link between APs and eNBs does not exist, traffic load measurements may be reported over a path through the network hierarchy from the AP to a WLAN element manager (EM) and up to a network manager (NM). The NM may then transmit the traffic load measurements down through a 3GPP domain manager (DM) and further to the eNBs in that domain.

Figure 1:
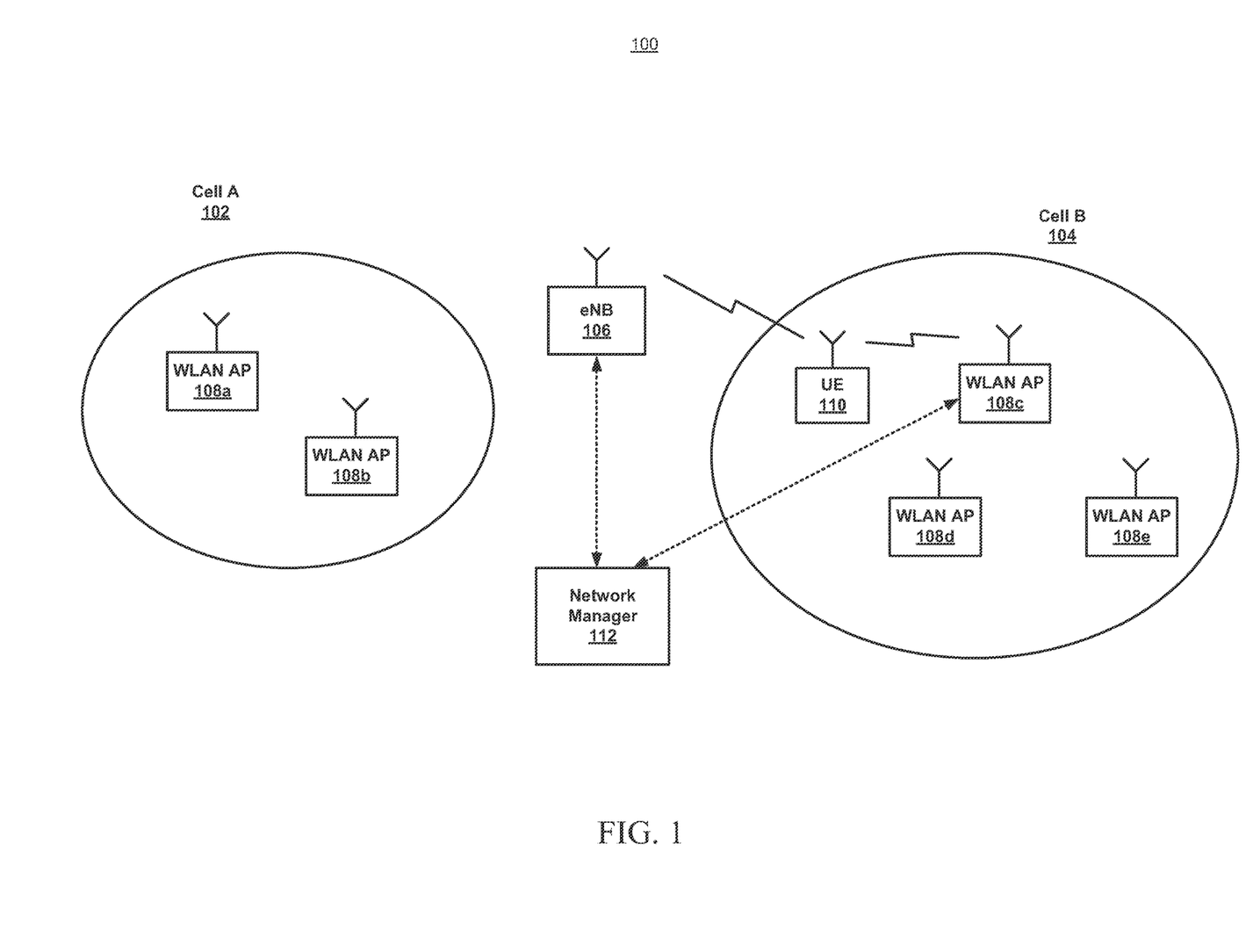
FIG. 1 illustrates a top level system diagram of one example embodiment consistent with the present disclosure.

FIG. 1 illustrates a top level system diagram 100 of one example embodiment consistent with the present disclosure. A wireless network is shown to include cell coverage areas Cell A 102 and Cell B 104 which may be served by an eNB 106. In another example embodiment, eNB 106 may provide coverage to two sectors, Cell A 102 and Cell B 104. Any number of WLAN APs 108 may be located or overlain in the network area of Cell A 102 or Cell B 104. A UE 110 may typically be configured to transmit voice and data traffic to and from the eNB 106. In some instances, however, for example under increased traffic conditions, the eNB 106 may offload some or all of the data traffic from the UE 110 to one or more of the WLAN APs 108. Network manager 112 may be configured to communicate with both the WLAN APs and the eNBs in the network, for example through domain managers, to provide WLAN AP traffic load measurements to the eNBs, to monitor the data offloading performance and to ensure increased efficiency and reliability of the system operation, as will be described in greater detail below While this is a simplified example, for illustration purposes, it will be appreciated that in practice any configuration of eNBs, UEs and WLAN APs of various types may be deployed and may provide coverage extending to any number or areas, regions or sectors. The wireless network may comply with, or otherwise be compatible with the IEEE 802.11 WLAN network standard, the Third Generation Partnership Project (3GPP) Long Term Evolution (LTE) and/or LTE-Advanced (LTE-A) based wireless network standard, including current, previous and future versions of that standard. These standards may include, for example, IEEE 802.11-2012, "Wireless LAN Medium Access Control (MAC) and Physical Layer (PHY) Specifications," and 3GPP TS 36.300, V11.2.0, "Evolved Universal Terrestrial Radio Access (E-UTRA) and Evolved Universal Terrestrial Radio Access Network (E-UTRAN); Overall description; Stage 2 (Release 11)."

Figure 2:
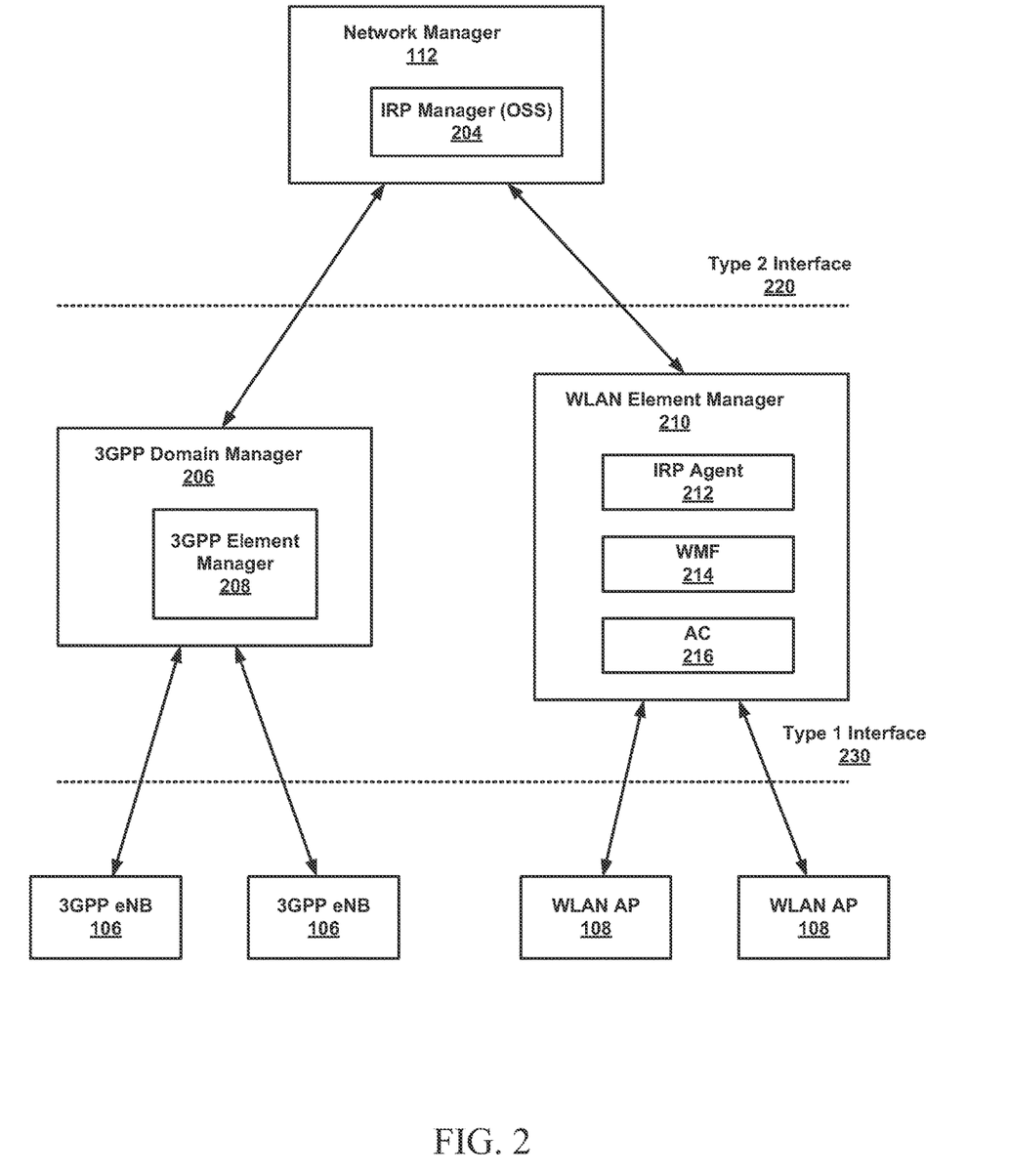
FIG. 2 illustrates a block diagram of one example embodiment consistent with the present disclosure.

FIG. 2 illustrates a block diagram 200 of one example embodiment consistent with the present disclosure. The network manager (NM) 112 is shown to include an IRP manager 204, also known as an operations support system (OSS). An IRP manager or OSS is typically a computer system and/or software application configured to provide and facilitate network management and support functions to network operators or providers. These support functions may include performance monitoring and fault detection. The IRP manager 204 may be configured to communicate with the 3GPP eNBs 106 through a 3GPP domain manager (DM) 206 which may include a 3GPP element manager 208. 3GPP domain manager 206 may be configured to provide both element and domain management function for a sub-network, while 3GPP element manager 208 may be configured to provide a set of end-user functions for management of a set of related types of network elements, for example 3GPP eNBs 106.

The IRP manager 204 may also be configured to communicate with the WLAN APs 108 through a WLAN element manager (EM) 210. WLAN element manager 210 may be configured to provide both element and domain management function for a sub-network and to provide a set of end-user functions for management of a set of related types of network elements, for example WLAN APs 108.

The 3GPP domain manager 206 and the WLAN domain manager 210 may be configured to provide a type 2 interface 220 to the network manager 112, which may be a standardized interface, while providing a type 1 interface 230 to the eNBs 106 and WLAN APs 108, which may be a proprietary interface. IRP manager 204 may be configured to communicate with an IRP Agent 212 residing in WLAN element manager 210 via type 2 interface 220. Any message translation that may be required between these two types of interfaces may be performed by the WLAN mapping function (WMF) module 214. WLAN element manager 210 may also include an Access Controller module 216 configured to manage and interface with the WLAN APs 108.

Figure 3:
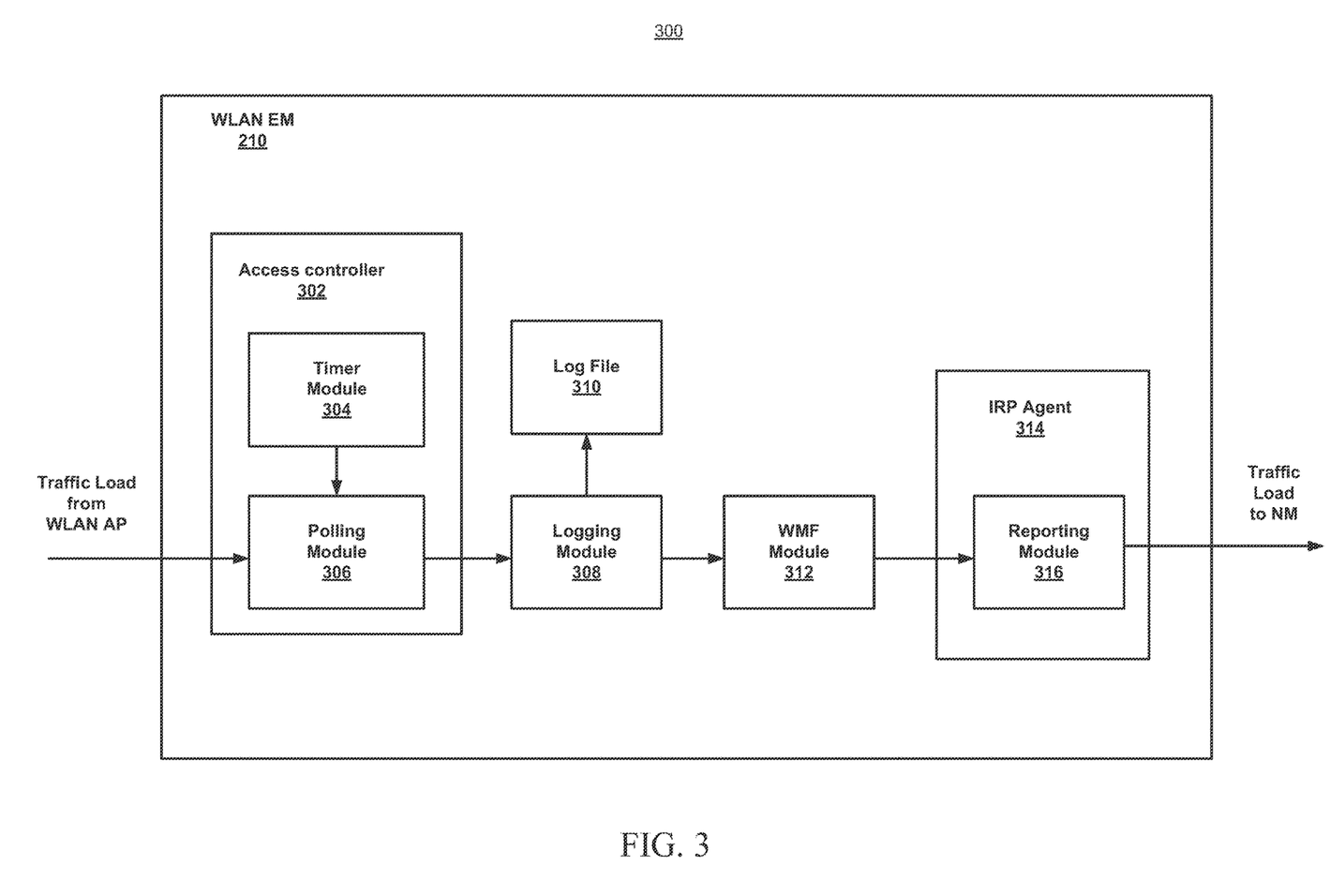
FIG. 3 illustrates a block diagram of another example embodiment consistent with the present disclosure.

FIG. 3 illustrates a block diagram 300 of another example embodiment consistent with the present disclosure. WLAN element manager 210 is shown to include access controller 302, logging module 308, log file 310, WMF module 312 and IRP agent 314, the operations of which will be explained in greater detail below. In some embodiments, access controller 302 may further include a timer module 304 and a polling module 306, while IRP agent may further include a reporting module 316.

The polling module 306 may be configured to poll the WLAN AP to request traffic load data. The polling may be triggered by the expiration of a timer at periodic intervals provided by timer module 304. The periodic intervals may be configurable or otherwise programmable based on traffic load management requirements of the eNBs. Logging module 308 may be configured to receive and log the requested traffic load data, for example in log file 310. Reporting module 316 may be configured to generate a traffic load report for transmission to network manager 112. The traffic load report is based on the logged traffic load data which may include indicators of channel utilization and available admission capacity as described below in connection with FIGS. 4 and 5. The traffic load report may be transmitted in response to a polling request from the NM 112.

The WMF module may be configured to map or translate the traffic load data from a WLAN standard interface format to a 3GPP standard interface format. The traffic load data may be incorporated into one or more data elements associated with a management information base (MIB) message transmitted to the NM via a standardized interface, for example type 2 interface 220.

The IRP manager 204 of the NM 112 may be configured to poll the WLAN EM 210, for example using a polling module, to request the traffic load reports. In some embodiments, the IRP manager 204 may also be configured with a notification handler to accept/receive unpolled traffic load reports from the WLAN EM 210. The IRP manager 204 may further be configured with a communications module to transmit the traffic load reports to the 3GPP DM 206 for subsequent transmission to the 3GPP eNBs to be used for determination of candidates of WLAN APs for data traffic offloading.

Figure 4:
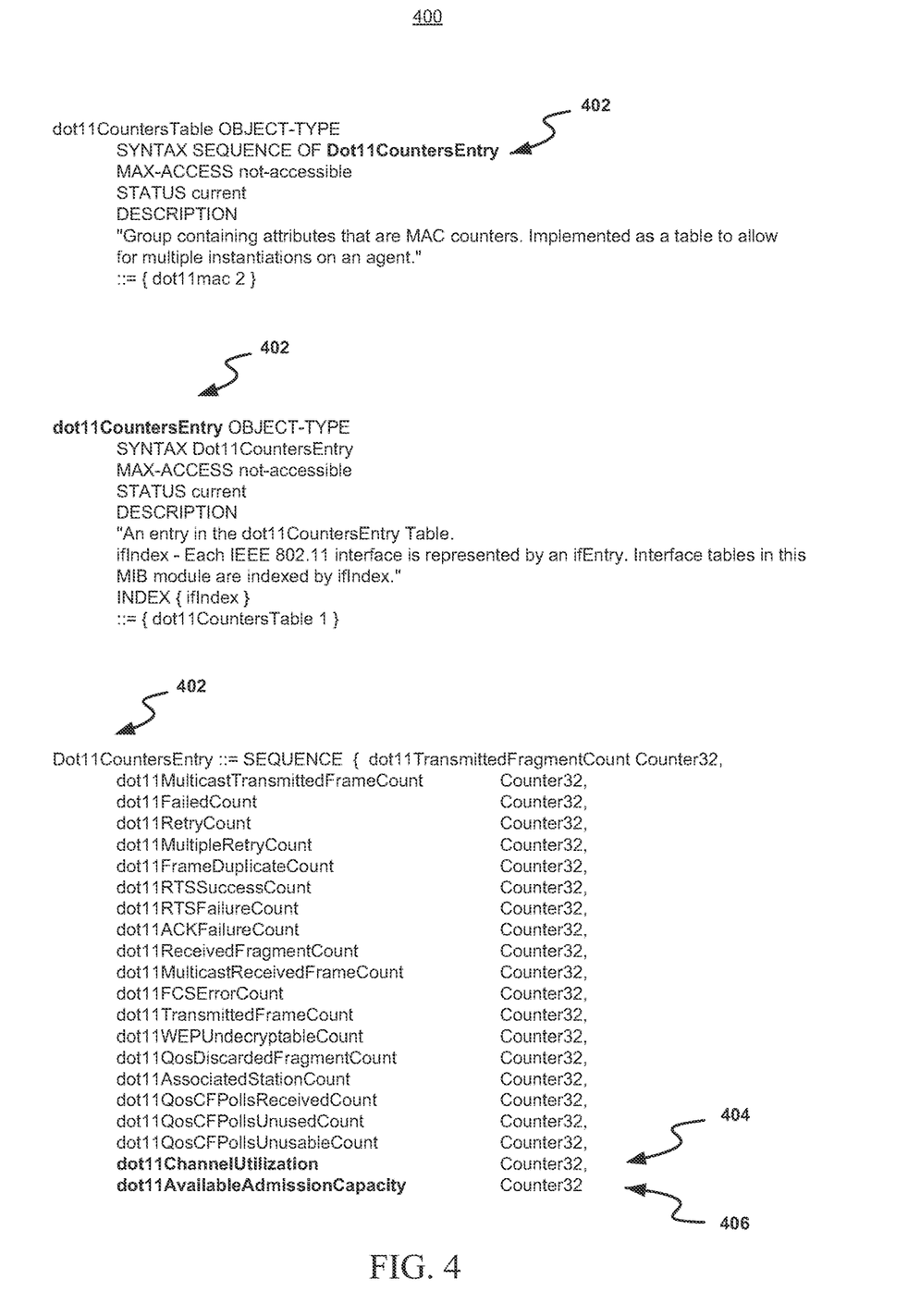
FIG. 4 illustrates a data structure associated with one example embodiment consistent with the present disclosure.

FIG. 4 illustrates a data structure 400 associated with one example embodiment consistent with the present disclosure. The WLAN element manager 210 may be configured to receive an MIB message that includes a Dot11CountersEntry 402 that provides a dot11Channel Utilization 404 data element and a dot11AvailableAdmissionCapacity 406 data element from a WLAN AP. These data elements 404, 406 may be configured to indicate data traffic load associated with a WLAN AP.

Figure 5:
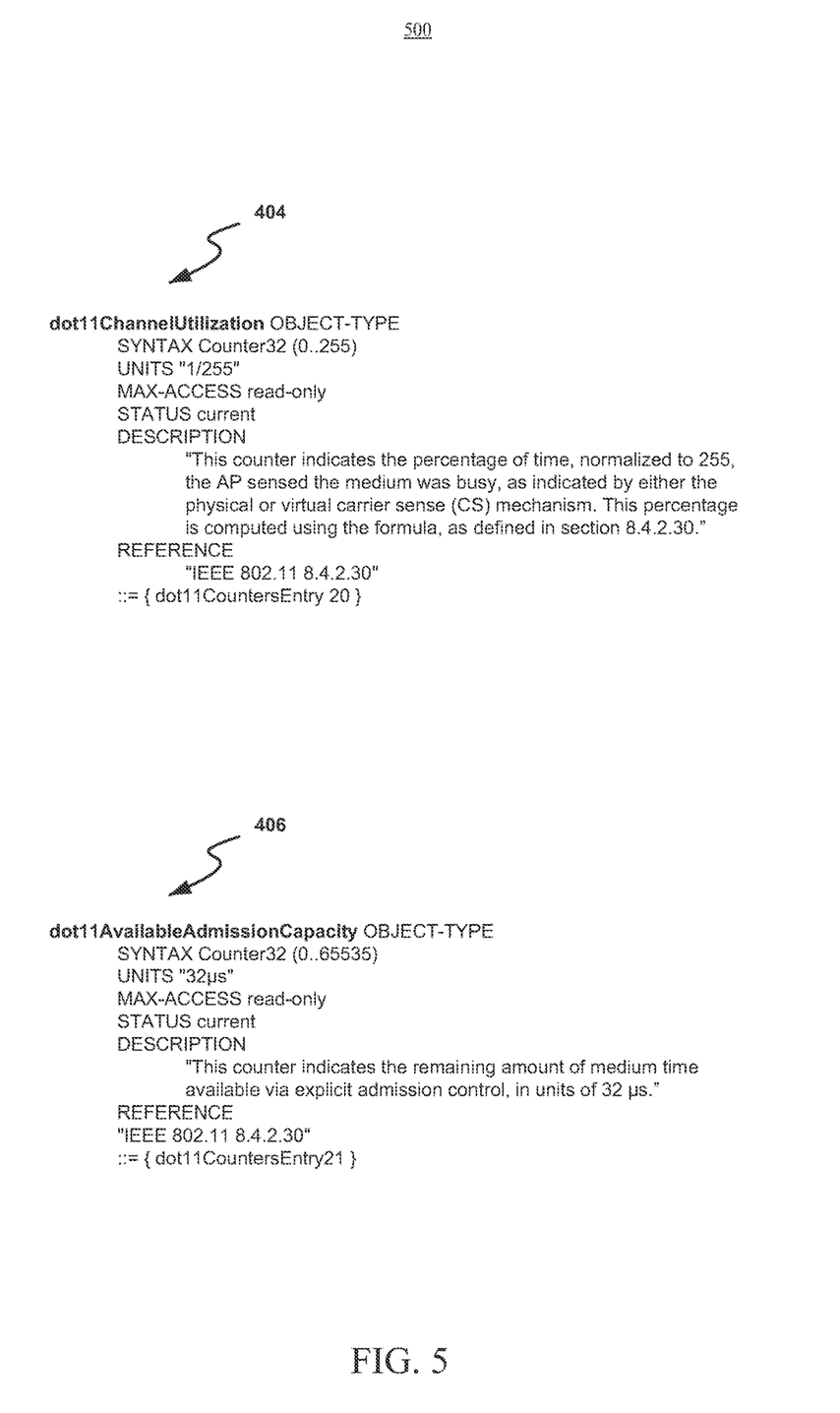
FIG. 5 illustrates a data structure associated with another example embodiment consistent with the present disclosure.

As further illustrated in FIG. 5, the dot11Channel Utilization 404 data element may be configured by the AP as a counter to indicate the percentage of time, over a given period, during which the medium was busy as sensed by the AP using either a physical or virtual carrier sense mechanism. The dot11Channel Utilization 404 may be normalized to a value of 255. The dot11AvailableAdmissionCapacity 406 data element may be configured by the AP as a counter to indicate a remaining amount of time available in the medium via explicit admission control. The dot11AvailableAdmissionCapacity 406 may be expressed in units of 32 microseconds.

Figure 6:
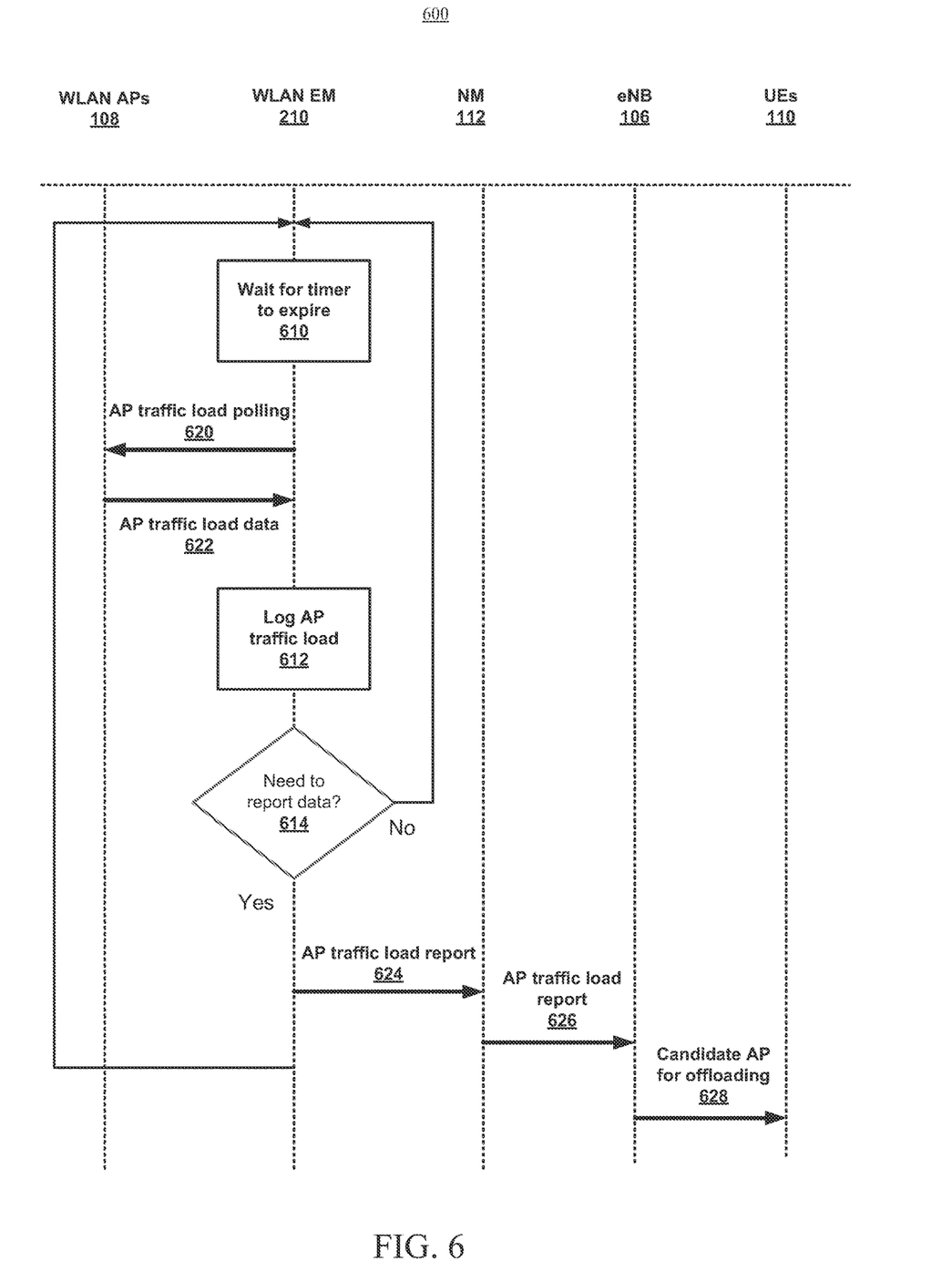
FIG. 6 illustrates a flow diagram of an example embodiment consistent with the present disclosure.

FIG. 6 illustrates a flow diagram 600 of an example embodiment consistent with the present disclosure. At operation 610, the WLAN EM 210 waits for the expiration of a timer. At operation 620, the WLAN EM 210 polls one or more of the WLAN APs 108 for traffic load data. At operation 630, the WLAN EM 210 receives traffic load data from one or more of the WLAN APs 108. At operation 612, the WLAN EM 210 logs the AP traffic load data. At operation 614, the WLAN EM 210 determines if there is a need to report the data, for example if a polling request was received from the NM 112 or if a notification timer expired. At operation 624, the traffic load report is transmitted from the EM 210 to the NM 112. At operation 626, the traffic load report is transmitted from the NM 112 to the eNB 106, for example through the DM 206. The eNB may determine which APs are in the vicinity of a UE and then, based on the traffic load report, select a subset of those closer APs which are relatively less loaded to be offload candidates for the UE. At operation 628, a candidate AP for offloading is transmitted from the eNB 106 to the UEs 110.

Figure 7:
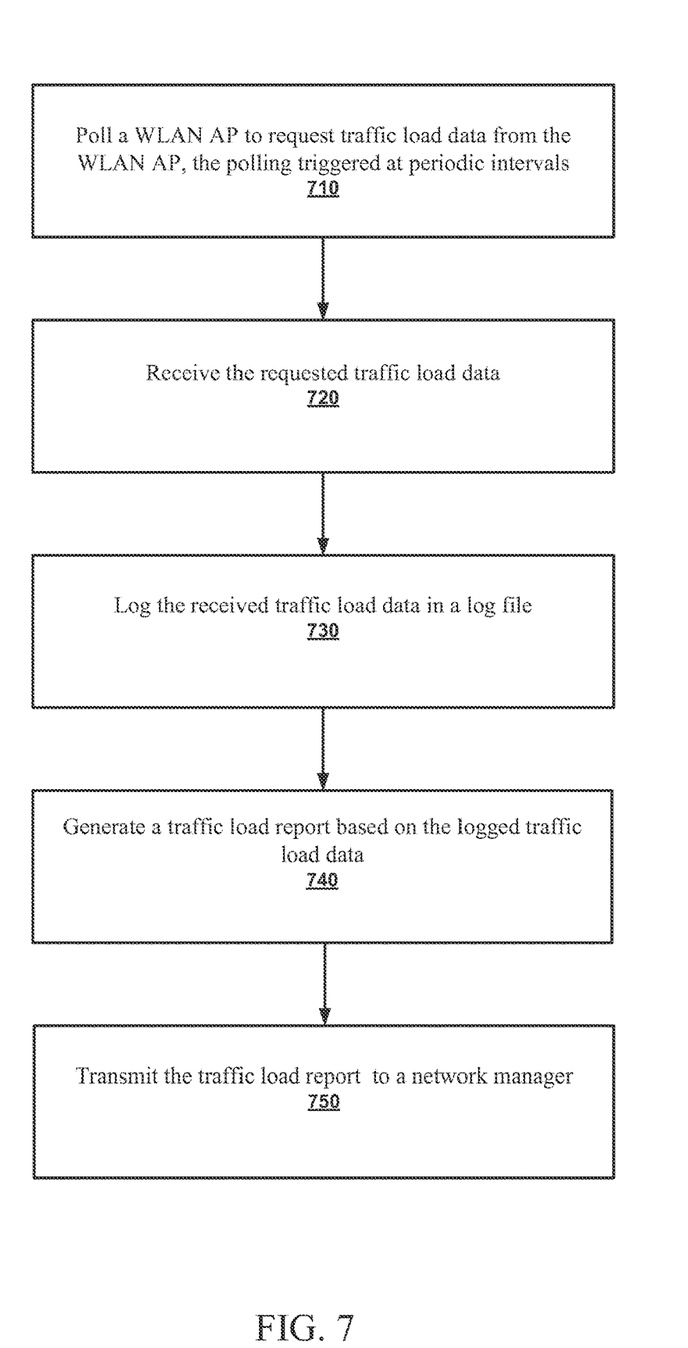
FIG. 7 illustrates a flowchart of operations of another example embodiment consistent with the present disclosure.

FIG. 7 illustrates a flowchart of operations 700 of another example embodiment consistent with the present disclosure. At operation 710, a WLAN AP is polled to request traffic load data from the WLAN AP. The polling is triggered at periodic intervals by a timer. At operation 720, the requested traffic load data is received. At operation 730, the received traffic load data is logged to a log file. At operation 740, a traffic load report is generated based on the logged traffic load data. At operation 750, the traffic load report is transmitted to a network manager. The network manager may subsequently transmit the traffic load report to an eNB which may then select, based on the traffic load report, one or multiple WLAN APs with lower traffic load as candidates for offloading.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides devices, methods, systems and computer-readable storage medium for provisioning of WLAN traffic load measurements to 3GPP wireless cellular networks. The following examples pertain to further embodiments.

According to one aspect there is provided a WLAN element manager (EM). The WLAN EM may include a polling module to poll a WLAN access point (AP), the polling to request traffic load data from the WLAN AP. The WLAN EM of this example may also include a timer module to trigger the polling module to poll at periodic intervals. The WLAN EM of this example may further include a logging module to receive and log the requested traffic load data. The WLAN EM of this example may further include an integration reference point (IRP) agent including a reporting module to generate a traffic load report for transmission to a network manager (NM), the traffic load report based on the logged traffic load data.

Another example WLAN EM includes the forgoing components and the traffic load data includes a channel utilization indicator.

Another example WLAN EM includes the forgoing components and the traffic load data includes an available admission capacity indicator.

Another example WLAN EM includes the forgoing components and further includes a WLAN Mapping Function (WMF) module to map the traffic load data from a WLAN standard interface format to a third generation partnership project (3GPP) standard interface format.

Another example WLAN EM includes the forgoing components and the reporting module provides the traffic load report to the NM in response to a polling request from the NM.

Another example WLAN EM includes the forgoing components and the reporting module incorporates the traffic load data in one or more data elements associated with a management information base (MIB) message transmitted to the NM via a standardized interface.

Another example WLAN EM includes the forgoing components and the periodic interval for polling is configurable based on traffic load management requirements of an evolved Node B (eNB).

According to another aspect there is provided an IRP manager. The IRP manager may include a polling module to poll a WLAN EM, the polling to request traffic load reports from the WLAN EM. The IRP manager of this example may also include a notification handler to receive unpolled traffic load reports from the WLAN EM. The IRP manager of this example may further include a communication module to transmit the traffic load reports to a 3GPP domain manager (DM) for transmission to a 3GPP eNB for determination of candidates of WLAN APs for data traffic offloading.

Another example IRP manager includes the forgoing components and the traffic load data reports include channel utilization indicators and available admission capacity indicators associated with one or more of the WLAN APs.

Another example IRP manager includes the forgoing components and the traffic load data reports are associated with a management information base (MIB) message transmitted to a network manager (NM) via a standardized interface, the NM hosting the IRP manager.

According to another aspect there is provided a method. The method may include polling a WLAN access point (AP) to request traffic load data from the WLAN AP, the polling triggered at periodic intervals. The method of this example may also include receiving the requested traffic load data. The method of this example may further include logging the received traffic load data in a log file. The method of this example may further include generating a traffic load report based on the logged traffic load data. The method of this example may further include transmitting the traffic load report to a network manager (NM).

Another example method includes the forgoing operations and the traffic load data includes a channel utilization indicator.

Another example method includes the forgoing operations and the traffic load data includes an available admission capacity indicator.

Another example method includes the forgoing operations and further includes mapping the traffic load data from a WLAN standard interface format to a third generation partnership project (3GPP) standard interface format.

Another example method includes the forgoing operations and further includes providing the traffic load report to the NM in response to a polling request from the NM.

Another example method includes the forgoing operations and further includes incorporating the traffic load data in one or more data elements associated with a management information base (MIB) message transmitted to the NM via a standardized interface.

Another example method includes the forgoing operations and further includes programming the periodic interval for polling based on traffic load management requirements of an evolved Node B (eNB).

According to another aspect there is provided at least one computer-readable storage medium having instructions stored thereon which when executed by a processor, cause the processor to perform the operations of the method as described in any of the examples above.

According to another aspect there is provided an apparatus including means to perform a method as described in any of the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A wireless local area network (WLAN) element manager (EM) for managing a WLAN domain comprising a group of WLAN access points (APs), comprising one or more processors configured to:
    poll a WLAN AP, the polling to request traffic load data from the WLAN AP;
    trigger the polling of the WLAN AP at a periodic interval for polling;
    receive the traffic load data through a type 1 interface and log the requested traffic load data;
    map the logged traffic load data from a WLAN standard interface format to a third generation partnership project (3GPP) standard interface format to generate 3GPP format traffic load data; and
    generate a traffic load report based on the 3GPP format traffic load data and transmit the traffic load report using a type 2 interface to a network manager (NM).

2. The WLAN EM of claim 1, wherein the periodic interval for polling the WLAN AP is configured based on traffic load requirements of a base station external to the WLAN domain.

3. The WLAN EM of claim 1, wherein the traffic load data comprises a channel utilization indicator.

4. The WLAN EM of claim 3, wherein the one or more processors are is configured to receive a management information base (MIB) message that includes a dot11ChannelUtilization data element corresponding to the channel utilization indicator.

5. The WLAN EM of claim 1, wherein the traffic load data comprises an available admission capacity indicator.

6. The WLAN EM of claim 5, wherein the one or more processors are is configured to receive a management information base (MIB) message that includes a dot11AvailableAdmissionCapacity data element corresponding to the available admission capacity indicator.

7. The WLAN EM of claim 1, wherein the one or more processors are configured to provide the traffic load report to the NM in response to a polling request from the NM.

8. The WLAN EM of claim 1, wherein the reporting module one or more processors are configured to incorporate the traffic load data in the 3GPP standard interface format in one or more data elements associated with a management information base (MIB) message transmitted to the NM via a standardized interface.

9. A method for traffic load measurement, comprising:
    polling, through a type 1 interface, a wireless local area network (WLAN) access point (AP) in a WLAN domain to request traffic load data from the WLAN AP, the polling triggered at a periodic interval for polling;
    receiving the requested traffic load data, wherein the traffic load data comprises a management information base (MIB) message that includes data elements associated with traffic load in the WLAN;
    logging the received traffic load data in a log file;
    mapping the logged traffic load data from a WLAN standard interface format to a third generation partnership project (3GPP) standard interface format to generate 3GPP format traffic load data;
    generating a traffic load report based on the 3GPP format traffic load data; and
    transmitting the traffic load report to a network manager (NM) using a type 2 interface.

10. The method of claim 9, wherein the periodic interval for polling the WLAN AP is configured based on traffic load requirements of base station external to the WLAN domain.

11. The method of claim 9, wherein the traffic load data comprises a channel utilization indicator.

12. The method of claim 11, wherein the traffic load data comprises a management information base (MIB) message that includes a dot11ChannelUtilization data element corresponding to the channel utilization indicator.

13. The method of claim 9, wherein the traffic load data comprises an available admission capacity indicator.

14. The method of claim 13, wherein the traffic load data comprises a management information base (MIB) message that includes a dot11AvailableAdmissionCapacity data element corresponding to the available admission capacity indicator.

15. The method of claim 9, further comprising transmitting the traffic load report to the NM in response to a polling request from the NM.

* * * * *